United States Patent [19]

Savary

[11] Patent Number: 4,755,346

[45] Date of Patent: Jul. 5, 1988

[54] DEVICE FOR DISPLACING AND LATCHING A CLUSTER OF CONTROL ELEMENTS IN A NUCLEAR REACTOR

[75] Inventor: Fernand Savary, Saint Leu la Foret, France

[73] Assignee: Framatome, Courbevoie, France

[21] Appl. No.: 813,300

[22] Filed: Dec. 26, 1985

[30] Foreign Application Priority Data

Dec. 27, 1984 [FR] France ................................ 84 19916

[51] Int. Cl.$^4$ .............................................. G21C 7/12
[52] U.S. Cl. .................................... 376/235; 376/209; 376/233
[58] Field of Search ............... 376/209, 219, 224, 225, 376/228, 230, 233, 234, 235, 258

[56] References Cited

U.S. PATENT DOCUMENTS

| 3,154,472 | 10/1964 | Shannon | 376/258 |
|---|---|---|---|
| 3,625,816 | 12/1971 | Aleite et al. | 376/333 |
| 3,905,634 | 9/1975 | Johnson et al. | 376/233 |
| 3,906,469 | 9/1975 | Kronk | 376/258 |
| 4,411,857 | 10/1983 | Sridhar | 376/233 |
| 4,486,382 | 12/1984 | Gravelle et al. | 376/258 |
| 4,544,521 | 10/1985 | Millot et al. | 376/209 |
| 4,604,576 | 8/1976 | Barrault | 376/258 |

Primary Examiner—Deborah L. Kyle
Assistant Examiner—Richard L. Klein
Attorney, Agent, or Firm—Pollock, Vande Sande & Priddy

[57] ABSTRACT

The device comprises a vertical shaft (36) movable along its axis under the action of a fluid pressure difference and having means for supporting at least one head (28) of the cluster and a first resilient finger (42) for securing and retaining the head on the support means. It comprises a high position securing mechanism carried by a fixed tube (20) for guiding the cluster and having at least one resilient finger for securing the head and retaining the head against the action of gravity and a vertically movable bolt urged resiliently to a position in which it prevents disengagement of a second resilient finger and cooperating with a mechanism controlling a second cluster so as to be brought into a position in which it releases the second resilient finger when the second cluster passes beyond the highest position assumed during normal operation.

6 Claims, 5 Drawing Sheets

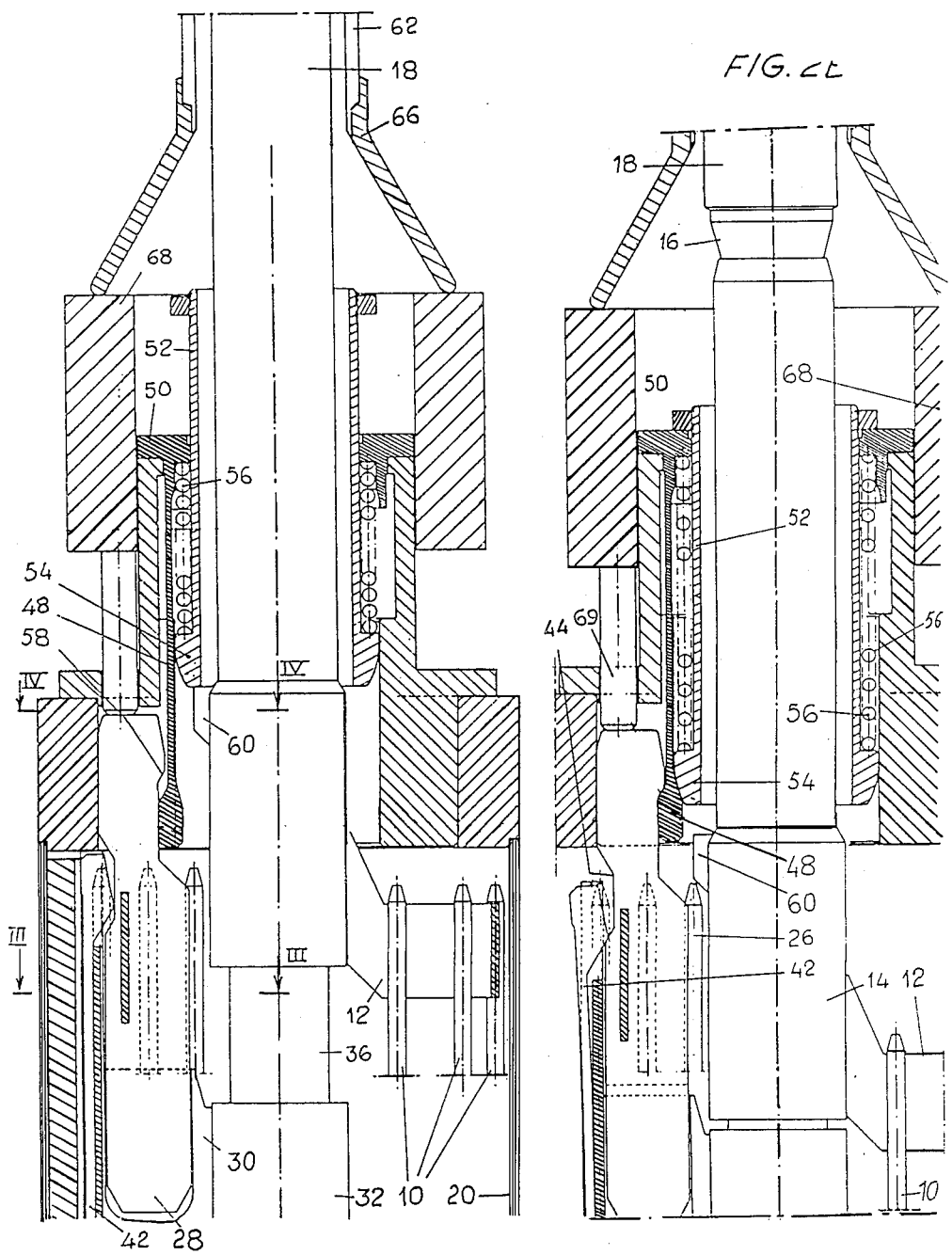

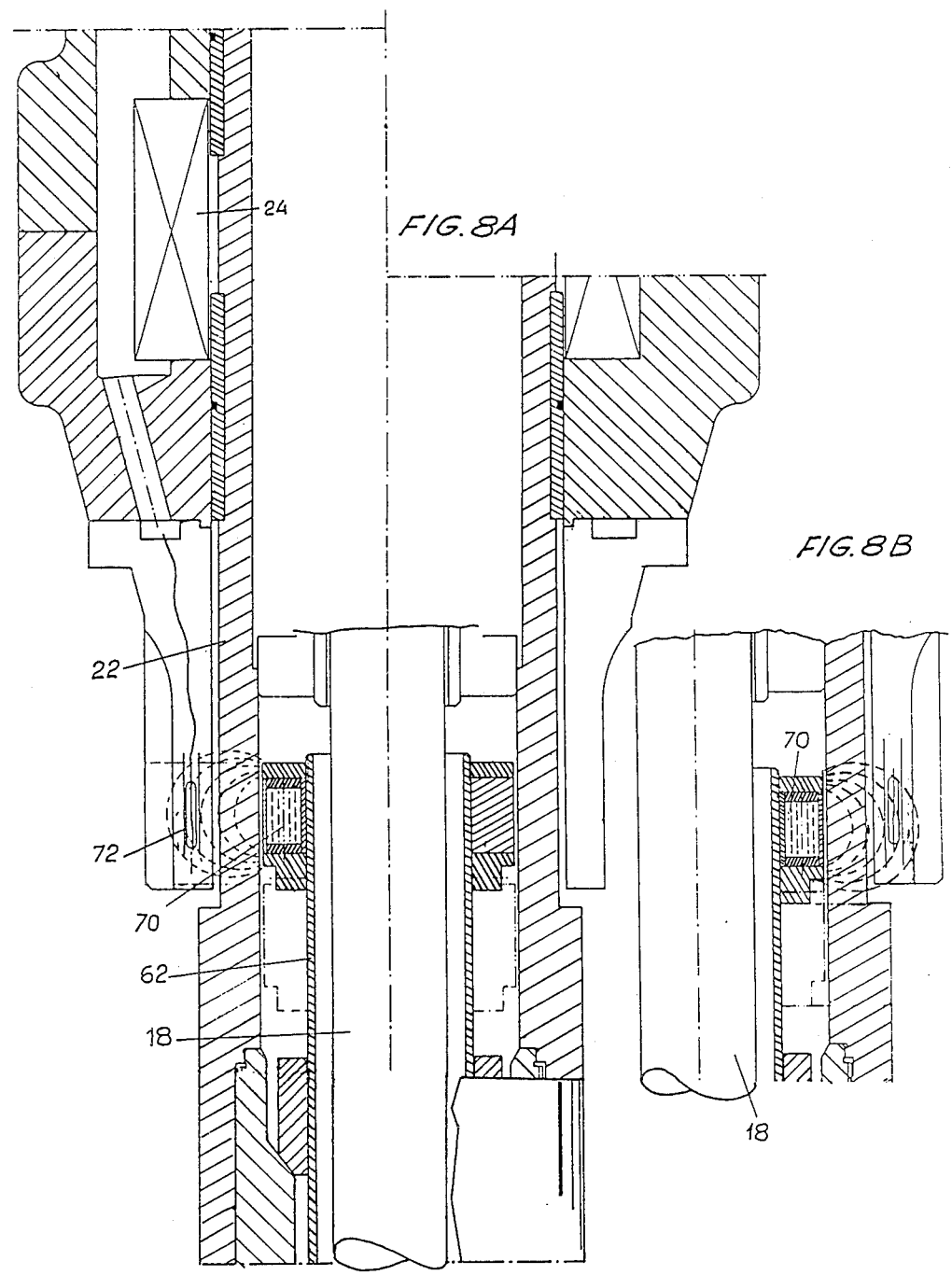

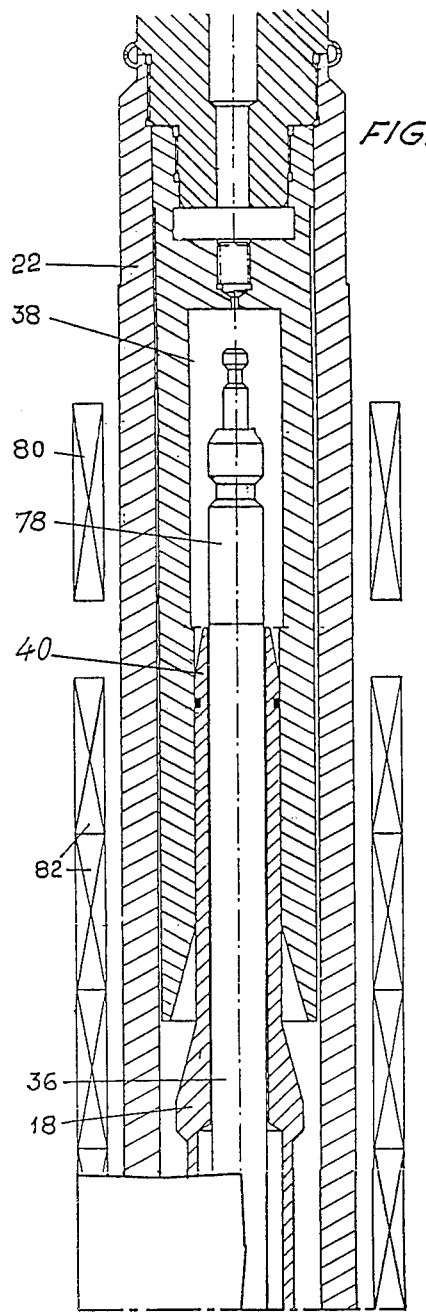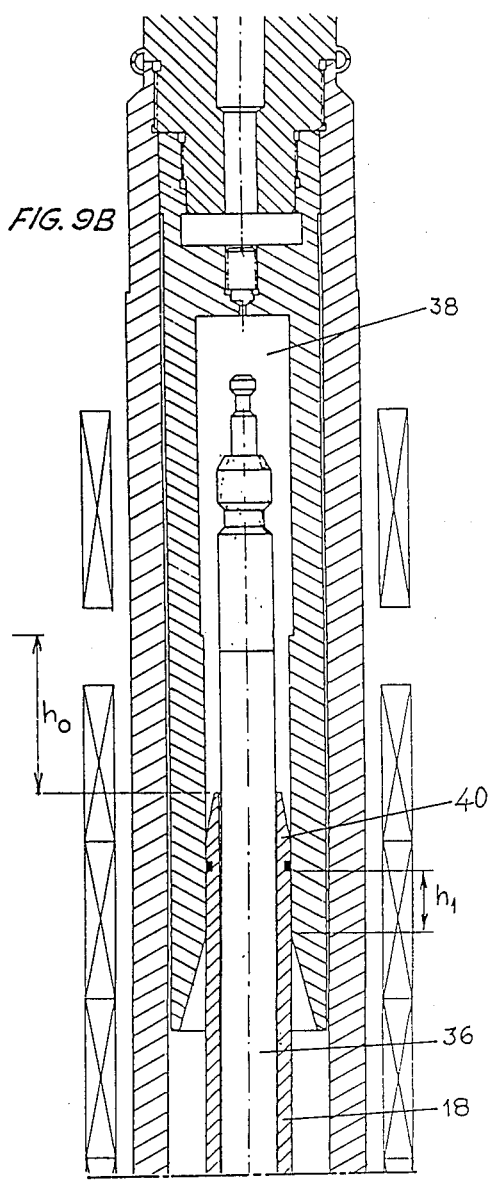

DEVICE FOR DISPLACING AND LATCHING A CLUSTER OF CONTROL ELEMENTS IN A NUCLEAR REACTOR

BACKGROUND OF THE INVENTION

The invention relates to devices for displacing and holding a cluster of control elements movable vertically in the core of a nuclear reactor, such a cluster being part of a set of two coaxially movable clusters fulfilling different functions.

With such sets, driving, power, control regulation, compensation of fuel exhaustion and shut down of a nuclear reactor can be better assured. Particularly, sets in which one of the clusters is formed of so called "black" elements having very high neutron absorption and the other clusters is formed of "grey" elements, have been proposed. The cluster of "black" elements is inserted in the core of the reactor by lowering it into it lowest position thus for shutting down the reaction and maintining it stopped. The displacement device may be partially shared by both clusters (French Pat. No. 2 106 373). It has also been proposed to have a separate device for each cluster (French Pat. No. 2537 764) one cluster including absorbent element and the other cluster elements containing fertile material. But none of the prior arrangements allows full freedom of displacement of one of the clusters, when the other cluster is in one of its endmost positions, except if complex mechanisms are installed.

SUMMARY OF THE INVENTION

It is an object of the invention to provide a device for vertically displacing a first cluster of control elements into and out of the core of a nuclear reactor, said device allowing to bring said first cluster and to hold it in one or other of its two endmost positions, while leaving full freedom of adjustment for a second cluster whatever which of the two endmost positions is occupied by the first cluster, and by using only simple means.

To this end, the invention provides a displacing and latching device which comprises a vertical shaft movable along its axis by a fluid pressure difference and carrying support means cooperating with at least one head of said first cluster to be moved and resiliently holding and retaining means for the head on the support means. The device further comprises a mechanism for latching in the top position, carried by a fixed cluster guide tube and having at least one resilient finger for securing the head and retaining said head against gravity and a bolt movable in the direction of displacement of said first cluster, resiliently based towards a position in which it prevents release of said resilient finger and cooperating with a mechanism controlling a second cluster when said first cluster is moved upwardly beyond the highest position taken by the second cluster in normal operation.

With this arrangement, the cluster to be moved is not subjected to the acceleration and shocks of the control mechanism of the other cluster, usually of electromagnetic type for step by step movement.

The invention also provides a device for displacing and latching a control element cluster movable vertically into and out of the core of a nuclear reactor, said device comprising a vertical shaft movable along its axis by the action of a fluid pressure difference and having means for supporting at least one head of said cluster and a first resilient finger for securing and retaining the head on the support means, further comprising a high position holding mechanism carried by a fixed cluster guide tube and having at least one resilient finger for securing the head and retaining said head against the action of gravity and a vertically movable bolt, resiliently biased towards a position in which it prevents disengagement of a second resilient finger and cooperating with a mechanism controlling a second cluster so as to be brought into a position in which it releases the second resilient finger when the second cluster is moved above the highest position taken during normal operation.

The high position securing mechanism will be generally carried by a fixed guide tube, belonging to the internals of the reactor and placed above a fuel assembly. The guide tube and an end piece of the assembly will be preferably both provided with sides for guiding the cluster support means, on which the support means are not simultaneously engaged, so as to accomodate possible eccentricity.

The device may comprise cluster position detection means comprising a counter weight movable axially between a low position which it occupies when at rest and a high position in which it is pushed back by the head or each head of the external cluster. A sensor detects the presence of the counter weight in its top position.

SHORT DESCRIPTION OF THE DRAWINGS

The invention will be better understood from the following description of a particular embodiment given by way of example. The description refers to the accompanying drawings in which:

FIGS. 2a and 2b are partial vertical sectional views of the portion of the device contained in the dash dot frame indicated by II in FIG. 1, showing the mechanism for latching the cluster in the high position, in two conditions taken successively by the components during a securing operation;

FIGS. 3 and 4 are sectional views through line III—III and IV—IV of FIG. 2a;

FIGS. 8a and 8b are sectional views through a vertical plane showing the detection means of the device, in the conditions corresponding respectively to FIGS. 2a and 2b;

FIGS. 9a and 9b are sectional views through a vertical plane of the portion of the device contained in the dash dot frame IX of FIG. 1, showing the control means respectively in the conditions corresponding to FIGS. 2a and 2b.

DETAILED DESCRIPTION OF THE INVENTION

The device which will now be described by way of example beongs to the control mechanism of a set of two clusters of control elements movable vertically for engaging them more or less deeper inside a same fuel assembly. For simplifying and since this mechanism comprises two coaxial shafts, that cluster which is controlled by the displacement and securing device will be designated by the term "internal cluster", because its control shaft is surrounded by the other. The other cluster will correlatively be called "external cluster". But it should of course be understood that this terminology is only used for more simplicity.

Figure 1:
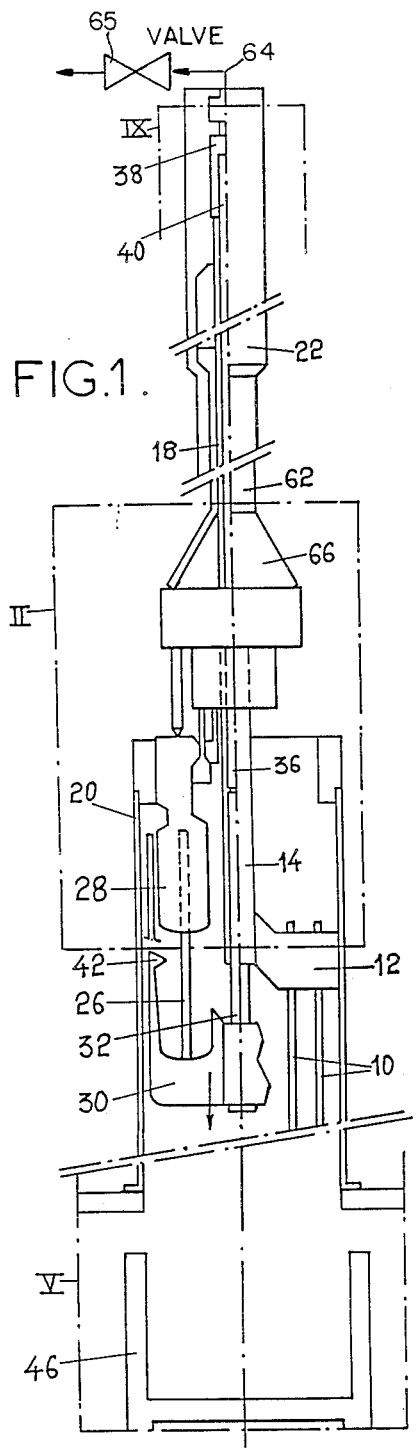
FIG. 1 is a general front diagrammatic view showing the main components of a device of the invention, placed in the upper internal structures of a reactor, the scale not being respected.

Referring to FIG. 1, there is very schematicaly shown the coaxial mounting of two control clusters associated with a mechanism whose general construction is similar to the one described in French Pat. No. 2 537 764, to which reference may be made. The external cluster comprises sixteen elements 10 supported by a cross shaped bracket 12 fast with a pommel or enlarged end 14 provided for coupling a terminal expandable sleeve 16 of a drive shaft 18. The cluster is guided in its movement by a guide tube 20 belonging to the upper internal equipment of the reactor, which equipment is supported by the upper core plate (not shown).

Shaft 18 is itself guided by a sleeve 22 passing through the cover of the vessel of the reactor and fluid-tight with said cover on which it is fixed. The external cluster is actuated by an electromagnetic gripper type drive device, only a single coil 24 of which is shown in FIG. 8a. This device may be identical to the one described in French Pat. No. 2 537 764 already mentioned.

In general, the elements 10 of the external cluster will contain a neutron absorbing material, such as a boron compound, and the external cluster will be used for controlling the reactor by introducing a greater or lesser length of the cluster into the assembly.

Figure 3:
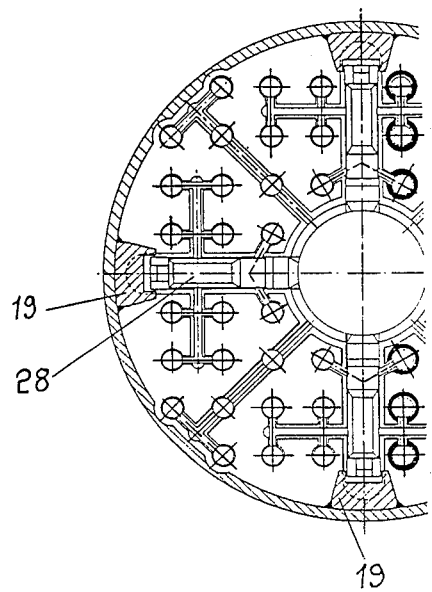
Figure 6:
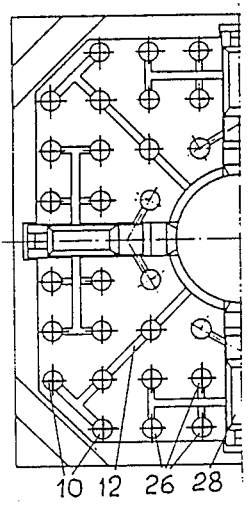
FIGS. 6 and 7 are sectional views through lines VI—VI and VII—VII of FIG. 5.
Figure 7:
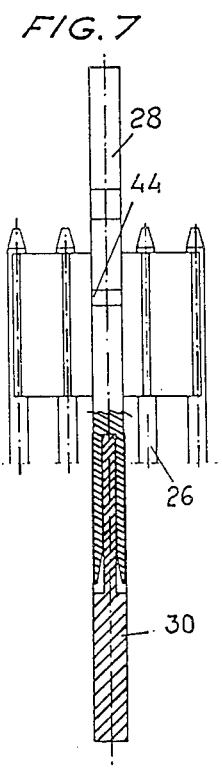
Figure 5:
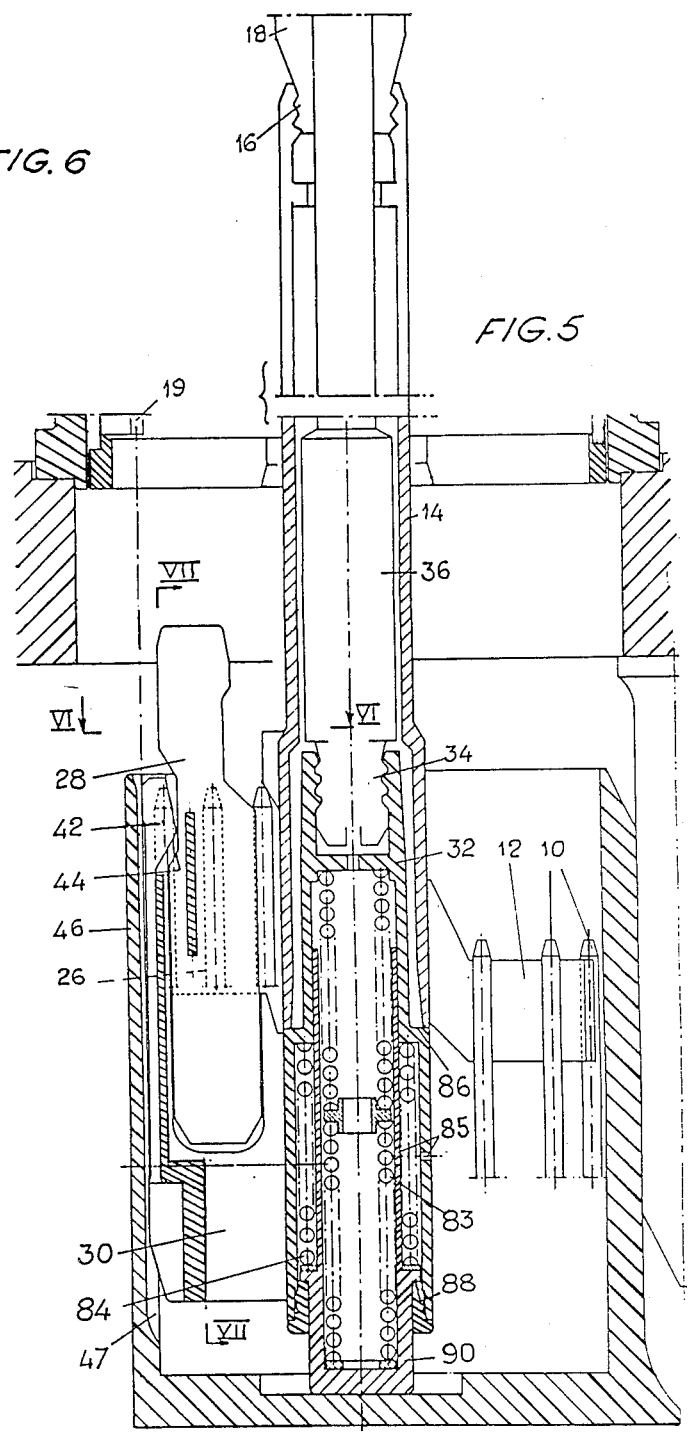
FIG. 5 is a sectional view through a vertical plane of the part of the device contained in the dash dot frame V of FIG. 1, the clusters being in the low position.

In the embodiment appearing on the Figures, the internal cluster comprises forty elements 26 divided into four groups offset by 90° around the vertical axis of the cluster. Each group will be designated hereafter by the term sub-group or sub-cluster. Each sub-group comprises a head 28 in the form of a radially disposed plate. The device providing vertical displacement of the sub-groups comprises a cross shaped bracket 30 having a pommel 32 in which may be locked the endmost resilient fingers of a sleeve 34 belonging to the displacement shaft 36 (FIG. 5). Four slides 19 (FIG. 3) are provided on tube 20 for guiding the pommel 32. Shaft 36 is controlled by a lifting device using the pressure of the moderating and cooling fluid (light water in a pressurized water reactor). For that, the endmost part 40 of shaft 18 forms a plunger fluid-tightly projecting into a decompression chamber 38 having an outlet duct 64 connected to a valve 65 for controlling the pressure which prevails in the chamber.

Elements 26 will for example contain fertile material. When the cluster of fertile elements is used for modifying the energy spectrum of the neutrons during the life of the reactor, the internal cluster will be completely introduced into the core when the assemblies are new (position shown in FIG. 5). But, during operation of the reactor, it will be required to extract some internal clusters and secure them in the top position illustrated on FIG. 2.

The head 28 of each sub-cluster is adapted for cooperating with one or other of two resilient securing blades one belonging to the cross shaped bracket 30 and the other to a block for securing the sub-clusters in the top position.

The four resilient blades 42 (one per sub-cluster) carried by pommel 32 are each disposed at the end of an arm of bracket 30. These resilient blades 42 are intended to prevent sub-clusters blow-up when the internal shaft 36 is in the low position. Each blade 42 ends in a nose piece which engages in a notch 44 in the head 28 of the corresponding sub-cluster and prevents raising. When pommel 32 is housed in the upper end piece 46 of the corresponding assembly (FIG. 5), the flexible blades 42 are held laterally by the end piece, cannot bend and positively retain the sub-clusters. Since this locking effect disappears when the pommel is outside end piece 46, the bending resistance of blades 42 must be sufficient to avoid untimely escape and raising of the sub-clusters. Like the guide tube, the end piece has centering slides 47 so that pommel 32 cannot free itself from one set of slides 47 and 19 before being engaged in the other.

Figure 4:
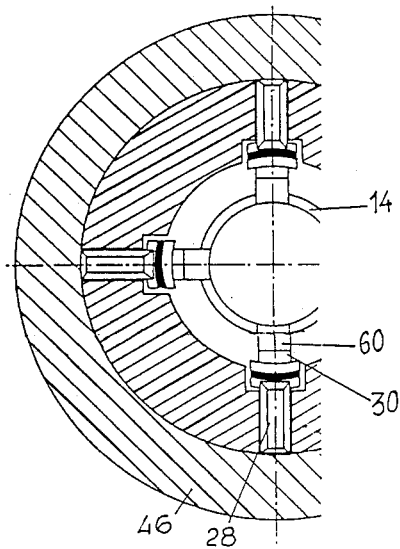

The block for securing the sub-clusters in the top position (FIGS. 2 to 4) also comprises one flexible blade 48 per sub-cluster. These four flexible blades are carried by a plate 50 mounted at the end of the guide tube 20. In this plate slides an annular bolt 52 ending in an enlarged portion 54. A spring 56 tends to force this bolt back to a low position in which it prevents blades 48 from bending inwardly while freeing the path of an end tooth 58 on head 28 (FIG. 2b). The pommel 14 of the external cluster has a projection 60 intended to come into abutment against the enlarged portion of bolt 54 and to raise it (FIG. 2a) so as to release blades 48, when shaft 18 goes beyond the highest position which it may take for controlling the reactor, that is to say when the shaft undergoes an upward over-travel.

The complete operation will be described further on. It may however already be mentioned that, when the flexible blades 48 are released by bolt 52, the heads 28 of the sub-clusters may engage in the respective housings formed in the latching block by bending blades 48. The upward movement of the sub-clusters under the action of shaft 36 is limited by the abutment of pommel 32 against the latching block (FIG. 2a). In this abutment position, the heads 28 are slightly above their permanent securing position (shown in FIGS. 2b). The device of the invention comprises a device for detecting the presence of the sub-clusters in the latching block. This device comprises a thermal protection muff 62 which, instead of being fixed, is mounted in sleeve 22 for sliding between a low position (when the sub-clusters are in the assembly) and a raised position (FIG. 8a). The detection means operate by determining the arrival of the muff in its top position. In the embodiment shown in FIGS. 8a and 8b, these means comprise a set of permanent magnets 70 which, in their rest position shown with a dot dash line, are situated below a set of electric contacts 72 placed in fluid-tight bulbs and adapted for closing when muff 62 is raised.

Muff 62 ends in a tulip 66 resting on a counter weight 68, supported, through pushers 69, by the heads 28 of the sub-clusters. The counter weight 68 and muff 62 thus tend to urge the sub-clusters from their top latched position upon unlocking and guarantee that the internal cluster drops when the corresponding shaft is or comes into a low position and when the latching block is unlocked.

The shaft 36 controlling the internal cluster is preferably provided with means for detecting the presence of this shaft at the top end of its travel. In the embodiment shown in FIGS. 9a and 9b, these means comprise an end ferromagnetic section 78 which, when it comes inside a detection coil 80, appreciably modifies the inductance thereof. These detection means confirm the presence of the sub-clusters in the latching block, also detected by raising of the thermal muff. Similarly, detection coils 82

(FIGS. 9a and 9b) may be provided for determining the positon of the shaft 18 controlling the external cluster, during its last steps of movement in excessive upward travel.

Pommel 32 of the external cluster is equipped with a multi purpose shock abosrber. This shock absorber must protect the fuel assembly against accidental dropping of the external cluster as well as of the internal cluster. For that purpose, it comprises a plunger 90 intended to come into abutment against the bottom of end piece 46 and two concentric springs which tend to maintain a collar of plunger 90 against an internal shoulder 88 of the pommel. This latter also has an external shoulder 86 which receives the impact of the bracket or spider 12 of the external cluster should this latter fall. The shock absorbing capacity provided by springs 83 and 84 will be increased by hydraulic shock absorption, controlled in sizing the holes 85 through which water escapes from the internal chamber of the pommel.

A possible sequence will now be described for securing the internal cluster in the top position and for releasing the bracket 30, allowing pommel 32 and the corresponding shaft 36 to move down again and leaving full freedom of manoeuvre for the external cluster, formed of absorbent elements 10.

The external cluster of absorbent elements is first of all brought to the end of its upward over-travel i.e. in the position shown in FIGS. 2a, 8a and 9a, by electromagnetic displacement means, comprising a coil 24. This end of over-travel corresponds to the engagement, in the last groove of shaft 18, of catches, (not shown) fitted to the fixed sleeve 22.

The securing block is at that moment unlocked, the blades 48 being released because bolt 52 is raised by projections 60 (FIG. 2a). The detection coils 82 allow a check to be made that the external cluster has reached the end of its upward over-travel.

The sub-clusters of the internal cluster may then be raised by means of shaft 36, actuated by decompression of chamber 38. Raising is usually caused by bringing the pressure in chamber 38 to a value 15 to 20 bars lower than that which prevails in the reactor. Shaft 36 then comes into the position shown in FIGS. 2a, 8a and 9a. The heads 28 of the sub-clusters are fully engaged in the housings provided in the latching block, slightly above the final securing level (FIG. 2a). In this position, the heads 28 raise the pushers 69, the counterweight 68 and muff 62. The presence of the sub-clusters in the latching block may consequently be detected in two different ways. On one hand, the switches contained in the bulbs 72 are closed by magnet 70; on the other hand, the presence of shaft 36 in its top endmost position is detected by coil 80, opposite to the magnetic portion 78.

For locking the sub-clusters in the latching block, shaft 18 is lowered by a height $h_O$ (FIG. 9b). The amplitude of the downward movement is determined both by counting the number of advancing steps of the electromagnetic means and by using the detection coils 82. The parts should be dimensioned so that, after lowering shaft 18 by amplitude $h_O$, this latter is still fluid-tightly engaged in the decompression chamber 38. A height $h_O$ may more particularly be adopted equal to 5 advancing steps and a height $h_1$ over which the shaft is still engaged which is equal to two steps.

During this downward operation, the depression in chamber 38 is maintained at the value to which it was previously brought. Shaft 36, from which the internal cluster is suspended, is therefore still in the top position.

But bolt 54, since it is no longer pushed upwardly, comes into abutment against the endmost enlarged portion of blades 48 and applies these blades against the teeth 58 of the sub-clusters.

The depression which prevails in the compression chamber 38 is then gradually reduced. The control shaft 36 moves down. The sub-clusters are immobilized as soon as heads 28 come into the position shown in FIG. 2b. This beginning of the drop of sahft 36 is indicated by the change of the signal supplied by coil 80.

With the continuing drop of shaft 36 and pommel 32, the anti-blow up blades 42 carried by the pommel leave notches 44, while being deformed so as to pass from the position shown with a broken line to the position shown with a full line in FIG. 2b. Then these blades slide along the edge of heads 28 of the sub-clusters and then resume their rest position (FIG. 1). The end of the drop of the pommel is slowed down by the shock absorber incoporated in the pommel (FIG. 5). It can be immediately seen that the sub-clusters have indeed remained secured by checking that all the switches in the bulbs 72 are still closed;

Once the securing has been effected and pommel 32 completely lowered, it can be seen that manoeuvering the external cluster is completely free.

The release of the sub-clusters and positioning thereof in the fuel assembly are provided by operations substantially the reverse of those which have just been described. It should be noted that shaft 36 is raised by controlling the depression in the decompression chamber 38 to a sufficiently low value so that the shaft rises at a moderate speed. The depression in chamber 38 is then increased to its maximum, before unlocking by manoeuvering shaft 18.

The embodiment of the device which has just been described by way of example is in no way limitative. The device may comprise additional members, more particularly for providing greater detection reliability. In particular, additional sensors for checking the presence of the sub-clusters at the bottom end of travel may be placed in the assembly end pieces. An additional hydraulic shock absorber may be provided for limiting shocks.

I claim:

1. In a nuclear reactor comprising a vessel, a removable cover for said vessel, a core including fuel nuclear assemblies in said vessel, upper internal equipments situated between said core and said cover, a plurality of first clusters of control elements, each having a top head and movable vertically into and out of said core within and along a guide tube fixed rigidly to said upper internal equipments, a device for displacing and latching one of said first clusters comprising:

(a) a vertical shaft vertically movable along its axis under the action of a fluid pressure difference across said shaft in a cylinder,
   (b) means for connecting said head of said first cluster to said shaft, having first resilient finger means carried by said shaft and notch means formed in said head for receiving said finger means and for resiliently securing and retaining said head on said shaft,
   (c) a high position head latching mechanism carried by the said fixed guide tube and having second resilient finger means arranged to resiliently engage cooperating means in said head for securing and retaining the head against gravity, and vertically movable bolt urged resiliently to a first position in which it positively prevents resilient deformation of said second resilient finger means and release thereof from said head, and (d) a mechanism for moving a second cluster vertically, cooperating with said bolt for positively moving said bolt into a second position in which it releases said second resilient finger means when the second cluster is moved above the highest position assumed during normal operation thereof.

2. A device according to claim 1, wherein the fixed guide tube and the end piece of the fuel assembly each comprises cluster guide slides, the slides being disposed so that the cluster engages one of the slides before it leaves another of said slides.

3. In a nuclear reactor comprising a vessel having a removable cover for said vessel, a core including fuel nuclear assemblies, upper internal equipments situated between said cover, at least one internal cluster of control elements movable vertically into and out of an assembly within and along a guide tube fixed rigidly to said upper equipment and placed above the assembly, said internal cluster comprising a plurality of sub-clusters each having a top head and also provided with an external cluster comprising at least one top head, movable coaxially with said first one and fulfilling a different function, said external cluster comprising at least one top head, a device for displacing and latching the internal cluster comprising:

(a) a vertical control shaft for said internal cluster,
(b) resilient blade means for connecting individually top heads of said sub-clusters to said shaft,
(c) drive means of said shaft for moving said internal cluster between a low position in which the internal cluster rests on the assembly and a high position in which the internal cluster is outside the assembly,
(d) a mechanism for latching the sub-clusters in the high position comprising a resilient finger for each sub-cluster, intended to fasten onto the head and retain said sub-clusters against gravity, said latching mechanism in the high position being supported by a guide tube of the internal cluster, and a mobile bolt urged resiliently to a position in which it prevents disengagement of the resilient fingers of said sub-clusters from said head, and
(e) a mechanism for moving the external cluster vertically, cooperating with said bolt for forcibly moving said bolt upwardly into a position in which it releases said resilient fingers when the external cluster is moved above the highest position assumed during normal operation thereof.

4. A device acording to claim 2, wherein the vertical shaft for controlling the internal cluster projects upwardly into a sleeve through a tubular shaft supporting the external cluster therefore delimiting in this sleeve a chamber which is closed by said support shaft of the external cluster when this latter is in the high position, means being provided for reducing the pressure which prevails in the chamber below the pressure which prevails in the whole vessel of the reactor.

5. A device according to claim 2, wherein it comprises means for detecting the position of the cluster, comprising a counter-weight movable axially between a low position which it occupies at rest and a high position into which it is pushed by the head or each head of the external cluster and a sensor for detecting the axial position of the counter-weight.

6. In a nuclear reactor comprising a vessel having a removable cover for said vessel, a core including fuel nuclear assemblies, upper internal equipments situated between said cover, at least one internal cluster of control elements movable vertcially into and out of an assembly within and along a guide tube fixed rigidly to said upper equipment and placed above the assembly, said internal cluster comprising a plurality of subclusters each having a top head and also provided with an external cluster comprising at least one top head, movable coaxially with said first one and fulfilling a different function, said external cluster comprising at least one top head, a device for displacing and latching the internal cluster comprising:

(a) a vertical control shaft for said internal cluster,
(b) resilient blade means for connecting individually top heads of said sub-clusters to said shaft,
(c) drive means of said shaft for moving said internal cluster between a low position in which the internal cluster rests on the assembly and a high position in which the internal cluster is outside the assembly,
(d) a mechanism for latching the sub-clusters in the high position comprising a resilient finger for each sub-cluster, intended to fasten onto the head and retain said sub-clusters against gravity, and a mobile bolt urged resiliently to a position in which it prevents disengagement of the resilient fingers of said sub-clusters from said head,
(e) a mechanism for moving the external cluster vertically, cooperating with said bolt for forcibly moving said bolt upwardly into a position in which it releases said resilient fingers when the external cluster is moved above the highest position assumed during normal operation thereof; and
(f) means for detecting the position of the cluster, comprising a counter-weight movable axially between a low position which it occupies at rest and a high position into which it is pushed by the head or each head of the external cluster, and a sensor for detecting the axial position of the counter-weight, said sensor being placed on a passage sleeve through the vessel of the reactor and cooperating with a sliding thermal protection muff supported by the counter-weight.

* * * * *